(12) United States Patent
Ha et al.

(10) Patent No.: US 7,611,103 B2
(45) Date of Patent: Nov. 3, 2009

(54) DISPLAY APPARATUS

(75) Inventors: Sang-kyeong Ha, Suwon (KR); Ju-hwan Kim, Suwon (KR); Jeong-su Jason Lim, Suwon (KR); Dong-hyug Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/792,745

(22) Filed: Mar. 5, 2004

(65) Prior Publication Data
US 2004/0231213 A1   Nov. 25, 2004

(30) Foreign Application Priority Data
May 23, 2003   (KR) ...................... 10-2003-0032950

(51) Int. Cl.
*A47F 5/00* (2006.01)
(52) U.S. Cl. .................... 248/125.2; 361/681; 267/154; 267/157; 267/179; 248/917; 248/125.1
(58) Field of Classification Search ................ 248/917, 248/919, 121, 122.1, 123.11, 125.1, 125.2, 248/125.8, 597, 579, 600, 625, 624, 291.1, 248/292.11, 292.13, 920, 923; 267/154, 267/158, 156, 157, 174, 179; 361/681, 682; 348/825, 827
See application file for complete search history.

(56) References Cited

U.S. PATENT DOCUMENTS 2,041,370 A    5/1936   Pottorff ...................... 248/159
2,042,443 A    5/1936   Buckstone ................... 248/411
2,628,142 A    2/1953   Dubach ........................ 311/39
2,890,010 A    6/1959   Barkheimer ................. 248/157

(Continued)

FOREIGN PATENT DOCUMENTS

CN    131010 C    2/1996

(Continued)

OTHER PUBLICATIONS

U.S. Appl. No. 10/295,831, filed Nov. 18, 2002, Hyun-jun Jung et al., Samsung Electronics Co, LTD.

(Continued)

*Primary Examiner*—A. Joseph Wujciak, III
(74) *Attorney, Agent, or Firm*—Staas & Halsey LLP

(57) ABSTRACT

A display apparatus including a base plate; a display main body to display a picture thereon; a lifting member standing on the base plate and combined to the display main body to adjust the height of the display main body; at least one spiral spring connected to the lifting member and to elastically support the weight of the display main body and to extend and retract accordingly as the display main body is lifted up and lowered down; a supporter connected to the spiral spring and to extend and retract the spiral spring via rotation; and a friction member inserted in the supporter to contact with the spiral spring and to generate a predetermined friction while the supporter rotates so that the height of the display main body is maintained even when the weight of the display main body is changed. Accordingly, a display apparatus having an adjustable a display main body even when the weight of the display main body is varies.

29 Claims, 8 Drawing Sheets

U.S. PATENT DOCUMENTS

| | | | |
|---|---|---|---|
| 3,285,207 A | 11/1966 | Vom Hagen | 108/146 |
| 3,434,684 A | 3/1969 | Warden | |
| 3,788,587 A | 1/1974 | Stemmler | 248/400 |
| 4,113,215 A | 9/1978 | Stapleton | 248/183 |
| 4,166,522 A | 9/1979 | Bourcier de Carbon | 188/287 |
| 4,235,405 A | 11/1980 | Carey | 248/123.1 |
| 4,329,800 A | 5/1982 | Shuman | 40/606 |
| 4,339,104 A | 7/1982 | Weidman | 248/407 |
| 4,395,010 A | 7/1983 | Helgeland et al. | 248/371 |
| 4,438,458 A | 3/1984 | Münscher | 358/254 |
| 4,447,031 A | 5/1984 | Souder, Jr. et al. | 248/280.1 |
| 4,601,246 A | 7/1986 | Damico | |
| 4,616,218 A | 10/1986 | Bailey et al. | |
| 4,669,694 A | 6/1987 | Malick | 248/397 |
| 4,690,362 A | 9/1987 | Helgeland | 248/404 |
| 4,691,886 A | 9/1987 | Wedling et al. | 248/183 |
| 4,729,533 A | 3/1988 | Hillary et al. | 248/184 |
| D295,415 S | 4/1988 | Thies et al. | D14/114 |
| 4,768,744 A | 9/1988 | Leeds et al. | 248/280.1 |
| 4,777,750 A | 10/1988 | Garfinkle | 40/607 |
| 4,834,329 A | 5/1989 | Delapp | 248/183 |
| 4,846,434 A | 7/1989 | Krogsrud | 248/280.1 |
| 4,859,092 A | 8/1989 | Makita | 400/83 |
| 4,864,601 A | 9/1989 | Berry | 379/96 |
| 4,924,931 A | 5/1990 | Miller | 160/135 |
| D313,405 S | 1/1991 | Barry et al. | D14/113 |
| 4,989,813 A * | 2/1991 | Kim et al. | 248/123.11 |
| 5,012,852 A | 5/1991 | Blackhurst | 160/351 |
| 5,088,676 A | 2/1992 | Orchard et al. | 248/421 |
| 5,102,084 A | 4/1992 | Park | 248/286 |
| 5,107,402 A | 4/1992 | Malgouires | 361/393 |
| 5,112,019 A | 5/1992 | Melzler et al. | 248/405 |
| 5,144,290 A | 9/1992 | Honda et al. | 340/711 |
| 5,163,652 A | 11/1992 | King | 248/538 |
| 5,206,790 A | 4/1993 | Thomas et al. | 361/380 |
| D337,104 S | 7/1993 | Orchard | D14/113 |
| D349,489 S | 8/1994 | Wang | 248/917 |
| 5,335,142 A | 8/1994 | Anderson | 361/681 |
| 5,383,138 A | 1/1995 | Motoyama et al. | 364/708.1 |
| 5,422,951 A | 6/1995 | Takahashi et al. | 379/454 |
| 5,437,236 A | 8/1995 | Zeiner | 108/147 |
| 5,549,264 A | 8/1996 | West | |
| 5,634,537 A | 6/1997 | Thorn | 188/300 |
| 5,751,548 A | 5/1998 | Hall et al. | 361/686 |
| 5,758,849 A | 6/1998 | Bui et al. | 248/125.1 |
| 5,771,152 A | 6/1998 | Crompton et al. | 361/681 |
| 5,799,917 A | 9/1998 | Li | 248/284.1 |
| 5,812,368 A | 9/1998 | Chen et al. | 361/681 |
| 5,835,342 A | 11/1998 | Hunte | 361/681 |
| 5,876,008 A | 3/1999 | Sweere et al. | 248/325 |
| 5,894,633 A | 4/1999 | Kaneko | |
| 5,911,523 A | 6/1999 | Burchart | 40/406 |
| 5,924,665 A | 7/1999 | Sweere et al. | 248/285.1 |
| 5,941,493 A | 8/1999 | Cheng | 248/371 |
| 5,947,429 A | 9/1999 | Sweere et al. | |
| 5,975,472 A | 11/1999 | Hung | 248/278.1 |
| 5,992,809 A | 11/1999 | Sweere et al. | 248/278.1 |
| 5,997,493 A | 12/1999 | Young | 602/16 |
| 6,012,693 A | 1/2000 | Voeller et al. | 248/280.11 |
| 6,015,120 A | 1/2000 | Sweere et al. | 248/123.11 |
| 6,018,847 A | 2/2000 | Lu | 16/337 |
| 6,031,714 A | 2/2000 | Ma | 361/681 |
| 6,062,148 A | 5/2000 | Hodge et al. | 108/147 |
| 6,064,373 A | 5/2000 | Ditzik | 345/173 |
| 6,081,420 A | 6/2000 | Kim et al. | 361/681 |
| 6,113,046 A | 9/2000 | Wang | 248/278.1 |
| 6,116,690 A | 9/2000 | Larson | 297/344.19 |
| 6,134,103 A | 10/2000 | Ghanma | 361/681 |
| 6,145,797 A | 11/2000 | Uehara | |
| 6,164,611 A | 12/2000 | Kuhnke | 248/279.1 |
| 6,168,124 B1 | 1/2001 | Matsuoka et al. | 248/176.1 |
| 6,189,842 B1 | 2/2001 | Bergeron Gull et al. | 248/125.1 |
| 6,189,849 B1 | 2/2001 | Sweere et al. | 248/286.1 |
| 6,189,850 B1 | 2/2001 | Liao et al. | 248/292.14 |
| 6,231,021 B1 | 5/2001 | Hong | |
| 6,233,138 B1 | 5/2001 | Osgood | 361/681 |
| 6,266,794 B1 | 7/2001 | Loughmiller | 714/745 |
| 6,270,047 B1 | 8/2001 | Hudson | 248/286.1 |
| 6,276,655 B1 | 8/2001 | Byoun | |
| 6,288,891 B1 | 9/2001 | Hasegawa et al. | 361/681 |
| 6,305,659 B1 | 10/2001 | Metelski | 248/519 |
| 6,326,955 B1 | 12/2001 | Ditzik | 345/173 |
| 6,347,433 B1 | 2/2002 | Novin et al. | 16/367 |
| 6,352,226 B1 | 3/2002 | Gordon | 248/125.2 |
| 6,367,756 B1 | 4/2002 | Wang | 248/278.1 |
| 6,378,830 B1 | 4/2002 | Lu | |
| 6,381,125 B1 | 4/2002 | Mizoguchi et al. | 361/682 |
| 6,390,433 B1 | 5/2002 | Kasa-Djukic | 248/441.1 |
| 6,394,403 B1 | 5/2002 | Hung | 248/276.1 |
| 6,397,761 B1 | 6/2002 | Moore | 108/50.01 |
| 6,402,109 B1 | 6/2002 | Dittmer | 248/284.1 |
| 6,409,134 B1 | 6/2002 | Oddsen, Jr. | 248/274.1 |
| 6,419,196 B1 | 7/2002 | Sweere et al. | |
| 6,430,038 B1 | 8/2002 | Helot et al. | 361/681 |
| 6,478,275 B1 | 11/2002 | Huang | 248/284.1 |
| 6,494,150 B1 | 12/2002 | Phoenix et al. | 108/14.7 |
| 6,499,704 B2 | 12/2002 | Oddsen, Jr. | 248/125.1 |
| 6,502,792 B1 | 1/2003 | Cho et al. | 248/121 |
| 6,522,530 B2 | 2/2003 | Bang | 361/681 |
| 6,532,628 B2 | 3/2003 | Kim | |
| 6,585,201 B1 | 7/2003 | Reed | 248/181.1 |
| 6,592,090 B1 | 7/2003 | Li | 248/284.1 |
| 6,601,810 B2 | 8/2003 | Lee | |
| 6,609,272 B1 | 8/2003 | Lee | |
| 6,609,686 B2 | 8/2003 | Malizia | 248/125.8 |
| 6,672,533 B1 | 1/2004 | Regebro | 244/3.13 |
| 6,680,843 B2 | 1/2004 | Farrow et al. | 361/681 |
| 6,695,266 B1 | 2/2004 | Tsai | 248/125.8 |
| 6,695,274 B1 | 2/2004 | Chiu | 248/371 |
| 6,698,063 B2 | 3/2004 | Kim et al. | |
| 6,702,238 B1 * | 3/2004 | Wang | 248/125.8 |
| 6,708,940 B2 | 3/2004 | Ligertwood | 248/123.11 |
| 6,712,321 B1 * | 3/2004 | Su et al. | 248/123.11 |
| D489,370 S | 5/2004 | Jobs et al. | D14/371 |
| 6,766,994 B2 | 7/2004 | Serbinski et al. | 248/371 |
| 6,769,657 B1 | 8/2004 | Huang | 248/278.1 |
| 6,796,541 B2 | 9/2004 | Lu | |
| 6,819,550 B2 | 11/2004 | Jobs et al. | 361/683 |
| 6,822,857 B2 | 11/2004 | Jung et al. | 361/681 |
| 6,837,469 B2 | 1/2005 | Wu et al. | 248/278.1 |
| 6,857,610 B1 | 2/2005 | Conner et al. | 248/284.1 |
| 6,874,743 B2 | 4/2005 | Watanabe et al. | |
| 6,889,958 B2 | 5/2005 | Hoffend, Jr. | 254/276 |
| 6,905,099 B2 | 6/2005 | Sung et al. | |
| 6,954,221 B2 | 10/2005 | Wu | |
| 7,055,218 B2 | 6/2006 | Lu et al. | |
| 7,168,665 B2 | 1/2007 | Hong et al. | |
| 7,177,144 B2 | 2/2007 | Ha et al. | |
| 7,195,214 B2 | 3/2007 | Lee et al. | |
| 7,237,755 B2 | 7/2007 | Cho et al. | |
| 7,274,555 B2 | 9/2007 | Kim et al. | |
| 2001/0017761 A1 | 8/2001 | Ditzik | 361/681 |
| 2002/0011544 A1 | 1/2002 | Bosson | 248/121 |
| 2002/0020792 A1 | 2/2002 | Lee | |
| 2002/0130981 A1 | 9/2002 | Ma et al. | 348/843 |
| 2003/0075649 A1 | 4/2003 | Jeong et al. | 248/157 |
| 2003/0075653 A1 | 4/2003 | Li | 248/274.1 |
| 2003/0080949 A1 | 5/2003 | Ditzik | 345/173 |
| 2003/0086240 A1 | 5/2003 | Jobs et al. | 361/683 |
| 2003/0132360 A1 | 7/2003 | Ju | 248/371 |
| 2003/0142474 A1 | 7/2003 | Karidis et al. | 361/683 |
| 2004/0011932 A1 * | 1/2004 | Duff | 248/157 |
| 2004/0056161 A1 * | 3/2004 | Ishizaki et al. | 248/176.3 |
| 2004/0057197 A1 | 3/2004 | Hill et al. | 361/683 |

| | | | | |
|---|---|---|---|---|
| 2004/0084585 A1 | 5/2004 | Watanabe et al. | | 248/276.1 |
| 2004/0084588 A1 | 5/2004 | Liu et al. | | 248/291.1 |
| 2004/0118984 A1* | 6/2004 | Kim et al. | | 248/149 |
| 2006/0219849 A1 | 10/2006 | Chiu | | |

FOREIGN PATENT DOCUMENTS

| | | | |
|---|---|---|---|
| CN | 2504675 | 8/2002 | |
| DE | 2847135 | 5/1980 | |
| DE | 39 43 137 A1 | 8/1991 | |
| DE | 4214341 A1 | 11/1993 | |
| DE | 200 09 691 | 11/2000 | |
| EP | 0 046 225 | 2/1982 | |
| EP | 244 566 | 2/1987 | |
| EP | 631 174 B1 | 6/1993 | |
| EP | 1085753 | 3/2001 | |
| GB | 2 206 464 | 1/1989 | |
| JP | 57-151990 | 9/1982 | |
| JP | 61-99873 | 5/1986 | |
| JP | 61-99874 | 5/1986 | |
| JP | 61-196314 | 8/1986 | |
| JP | 62-96681 | 5/1987 | |
| JP | 62-96682 | 6/1987 | |
| JP | 62-239677 | 10/1987 | |
| JP | 1-273086 | 10/1989 | |
| JP | 2-58783 | 4/1990 | |
| JP | 02-215408 | 8/1990 | |
| JP | 2-215408 | 8/1990 | |
| JP | 03-2381 | 1/1991 | |
| JP | 03-29800 | 3/1991 | |
| JP | 3-29800 | 3/1991 | |
| JP | 3-095586 | 4/1991 | |
| JP | 3-113423 | 11/1991 | |
| JP | 03-113423 | 11/1991 | |
| JP | 03-114875 | 11/1991 | |
| JP | 3-114875 | 11/1991 | |
| JP | 4-15680 | 1/1992 | |
| JP | 4-33073 | 3/1992 | |
| JP | 04-33073 | 3/1992 | |
| JP | 04-81182 | 3/1992 | |
| JP | 4-81182 | 3/1992 | |
| JP | 4-155375 | 5/1992 | |
| JP | 4-198979 | 7/1992 | |
| JP | 3-017022 | 9/1992 | |
| JP | 4-107284 | 9/1992 | |
| JP | 4-132517 | 12/1992 | |
| JP | 5-36523 | 2/1993 | |
| JP | 1993-23576 | 3/1993 | |
| JP | 5-097098 | 4/1993 | |
| JP | 5-36423 | 5/1993 | |
| JP | 05-36423 | 5/1993 | |
| JP | 05-188865 | 7/1993 | |
| JP | 5-188865 | 7/1993 | |
| JP | 05-66715 | 9/1993 | |
| JP | 6-4778 | 1/1994 | |
| JP | 64778 | 1/1994 | |
| JP | 6-21079 | 3/1994 | |
| JP | 6-118880 | 4/1994 | |
| JP | 6-37912 | 5/1994 | |
| JP | 8-121009 | 5/1996 | |
| JP | 8-234672 | 9/1996 | |
| JP | 8-319753 | 12/1996 | |
| JP | 10-126068 | 5/1998 | |
| JP | 10-214034 | 8/1998 | |
| JP | 10-228333 | 8/1998 | |
| JP | 11-006520 | 1/1999 | |
| JP | 11-095866 | 4/1999 | |
| JP | 11-154460 | 6/1999 | |
| JP | 11-214859 | 8/1999 | |
| JP | 11-338576 | 12/1999 | |
| JP | 2000-019981 | 1/2000 | |
| JP | 2000-56695 | 2/2000 | |
| JP | 3068198 | 2/2000 | |
| JP | 2000-122561 | 4/2000 | |
| JP | 2000-206893 | 7/2000 | |
| JP | 2000-206901 | 7/2000 | |
| JP | 2000-242363 | 9/2000 | |
| JP | 3073553 | 9/2000 | |
| JP | 2000267581 | 9/2000 | |
| JP | 2001-241427 | 11/2000 | |
| JP | 2001-50244 | 3/2001 | |
| JP | 2001-142407 | 5/2001 | |
| JP | 2001-202026 | 7/2001 | |
| JP | 20026990 | 1/2002 | |
| KR | 1989-3755 | 6/1989 | |
| KR | 88-3444 | 10/1989 | |
| KR | 1989-20328 | 10/1989 | |
| KR | 1991-0009310 | 5/1991 | |
| KR | 114350 | 11/1997 | |
| KR | 1997-63717 | 12/1997 | |
| KR | 1998-4698 | 3/1998 | |
| KR | 163133 | 9/1998 | |
| KR | 1998-54989 | 12/1998 | |
| KR | 1999-0040596 | 6/1999 | |
| KR | 1999-40596 | 6/1999 | |
| KR | 1999-0073869 | 10/1999 | |
| KR | 20-168389 | 11/1999 | |
| KR | 2000-722 | 1/2000 | |
| KR | 2000-725 | 1/2000 | |
| KR | 2000-827 | 1/2000 | |
| KR | 20-182808 | 3/2000 | 5/655 |
| KR | 20-184275 | 3/2000 | |
| KR | 20-0178710 | 4/2000 | |
| KR | 20-0191805 | 8/2000 | |
| KR | 20-215332 | 12/2000 | 9/46 |
| KR | 2000-73608 | 12/2000 | 5/655 |
| KR | 2000-0074849 | 12/2000 | |
| KR | 10-0289438 | 2/2001 | |
| KR | 2002-5136 | 2/2001 | |
| KR | 20-227925 | 4/2001 | |
| KR | 20-227953 | 4/2001 | |
| KR | 2001-0035722 | 5/2001 | |
| KR | 2001-35722 | 5/2001 | |
| KR | 20-0227925 | 6/2001 | |
| KR | 20-239991 | 7/2001 | |
| KR | 2001-53963 | 7/2001 | |
| KR | 2001-56960 | 7/2001 | |
| KR | 2001-83865 | 9/2001 | |
| KR | 20-251611 | 10/2001 | |
| KR | 20-0253576 | 11/2001 | |
| KR | 20-0256013 | 11/2001 | |
| KR | 20-256809 | 11/2001 | |
| KR | 20-259625 | 12/2001 | 5/655 |
| KR | 2002-5136 | 1/2002 | 1/13 |
| KR | 20002-5136 | 1/2002 | |
| KR | 2002-0029516 | 4/2002 | |
| KR | 20-279427 | 6/2002 | 1/16 |
| KR | 20-0279427 | 6/2002 | |
| KR | 10-353035 | 9/2002 | |
| KR | 20-295990 | 11/2002 | 1/16 |
| KR | 20-304340 | 2/2003 | 1/16 |
| KR | 2003-0058204 | 7/2003 | |

OTHER PUBLICATIONS

U.S. Appl. No. 10/314,350, filed Dec. 1, 2002, Sang-kyeong Ha et al., Samsung Electronics Co. LTD.
U.S. Appl. No. 10/646,864, filed Apr. 1, 2003, You-Sik Hong et al., Samsung Electronics Co. LTD.
U.S. Appl. No. 10/671,605, filed Sep. 1, 2003, Jun-soo Jeong, Samsung Electronics Co. LTD.
U.S. Appl. No. 10/671,863, filed Sep. 1, 2003, Ju-hwan Kim et al., Samsung Electronics Co. LTD.
U.S. Appl. No. 10/694,029, filed Oct. 1, 2003, Nam-il Cho et al., Samsung Electronics Co. LTD.

U.S. Appl. No. 10/694,041, filed Oct. 1, 2003, You-Sub Lee et al., Samsung Electronics Co. LTD.
U.S. Appl. No. 10/705,770, filed Nov. 1, 2003, Ju-hwan Kim et al., Samsung Electronics Co. LTD.
U.S. Appl. No. 10/792,742, filed Mar. 1, 2004, Sang-kyeong Ha et al., Samsung Electronics Co. LTD.
U.S. Appl. No. 10/916,436, filed Aug. 12, 2004, Hyun-jun Jung et al., Samsung Electronics Co, LTD.
U.S. Appl. No. 10/916,447, filed Aug. 12, 2004, Hyun-jun Jung et al., Samsung Electronics Co, LTD.
U.S. Appl. No. 10/406,269, filed Apr. 4, 2003, You-sik Hong et al., Samsung Electronics Co, LTD.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Korean Office Action issued on Mar. 8, 2006 in Korean Patent Application No. 10-2002-0050351 which corresponds to co-pending U.S. Patent Application No. 10/646,864.
U.S. Appl. No. 11/889,998, filed Aug. 17, 2007, Ju-hwan Kim et al., Samsung Electronics Co., Ltd.
Japanese Office Action dated Jun. 25, 2007 in Japanese Patent Application No. 2005-360909.
Japanese Office Action dated Jun. 25, 2007 in Japanese Patent Application No. 2005-360911.
Japanese Office Action dated Jun. 25, 2007 in Japanese Patent Application No. 2005-360915.
Korean Patent Office Action, mailed Oct. 19, 2007 and issued in corresponding Korean Patent Application No. 10-2002-0069680.

* cited by examiner

DISPLAY APPARATUS

CROSS-REFERENCE TO RELATED APPLICATIONS

This application claims the benefit of Korean Patent Application No. 2003-32950, filed May 23, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus having a spiral spring to selectively adjust the height of a display main body according to weight of the display main body.

2. Description of the Related Art

Generally, a display apparatus comprises a display main body to display a picture thereon, and a stand to support the display main body. Recently, demand for display apparatuses has rapidly increased along with development of information technology, and thus, display apparatuses having various shapes with improved functions, and that are convenient to use have been developed to satisfy users' various requirements.

For example, a display apparatus, disclosed in Korea Utility Model No. 20-279427 comprises: a base; a stand standing on the base; a plate combined to a back of a display main body and extending downward; a guide plate combined to the stand and provided with a pair of rail grooves; a slider having a projection inserted into the rail groove of the guide plate to allow sliding up and down along the guide plate; a pusher combined to a lower part of the slider and formed with a semicircular groove; and a spiral spring having a first end coupled to the stand and a second end spirally seated in the semicircular groove to elastically support the weight of the display main body.

However, according to the conventional display apparatus, the height of the display main body is not easily adjustable because friction is generated between the slider and the guide plate while the slider slides along the guide plate to lower the display main body. Further, friction is generated between the spiral spring and an area in which the spiral spring is seated, so that the display main body cannot be smoothly lifted up and lowered down.

SUMMARY OF THE INVENTION

Accordingly, it is an aspect of the present invention to provide a display apparatus having a display main body that remains at a desired height even when the weight of the display main body is changed.

The foregoing and/or other aspects of the present invention are achieved by providing a display apparatus comprising: a base plate; a display main body to display a picture thereon; a lifting member standing on the base plate and combined with the display main body to adjust height of the display main body; at least one spiral spring connected to the lifting member to elastically support weight of the display main body, and to extend and retract accordingly as the display main body is lifted up and lowered down; a supporter connected to the at least one spiral spring to extend/retract the at least one spiral spring via rotation; and a friction member inserted in the supporter to be in contact with the at least one spiral spring, and to generate a predetermined friction while the supporter rotates so that the height of the display main body is maintained even when the weight of the display main body is changed.

According to an aspect of the invention, the lifting member includes a guide rail standing on the base plate, and a slider slidably coupled with the guide rail and combined to the display main body.

According to another aspect of the invention, a pair of the lifting members are provided in parallel.

According to an aspect of the invention, the display apparatus further comprises: a guide bracket combined to an upper part of the guide rail; a spring supporting block combined to a lower part of the slider to cooperate with the slider; wherein the at least one spiral spring has a first end coupled to the guide bracket and a second end coupled to the spring supporting block.

According to an aspect of the invention, the at least one spiral spring includes a wound part coupled to the guide bracket, and a fastening part extended from the wound part and fastened to the spring supporting block.

According to another aspect of the invention, the at least one spiral spring comprises a pair of spiral springs provided to the front and rear of the guide bracket, respectively.

According to an aspect of the invention, the guide bracket is formed with first and second accommodating parts to accommodate the pair of spiral springs, and third and fourth accommodating parts to accommodate the guide rails.

According to another aspect of the invention, the supporter includes a roller shaft horizontally inserted in the first/second accommodating part, and a spring roller in which the roller shaft is rotatably inserted and on which the wound part the at least one spiral spring is wound.

According to an aspect of the invention, the friction member is inserted in the spring roller, and the friction member is in contact with a circumference of the roller shaft.

According to an aspect of the invention, the spring roller is formed with a fitting groove into which the friction member is fitted.

According to an aspect of the invention, the friction member further includes a friction spring.

According to an aspect of the invention, the display apparatus further comprises a breakaway prevention washer provided on one side of the spring roller to prevent the friction member from breaking away from the spring roller.

According to an aspect of the invention, a ball bearing is provided between the guide rail and the slider.

According to an aspect of the invention, the ball bearing is interposed between the guide rail and the slider, and further comprises: a supporting pin disposed along a lengthwise direction of the guide rail, and a rolling ball rotatably supported between the guide rail and the slider via the supporting pin and in rolling-contact with the slider.

According to an aspect of the invention, a supporting bracket is provided between the display main body and the guide bracket having a supporting part to support the display main body, and an extended part extended down from the supporting part and combined with the slider.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Figure 1:
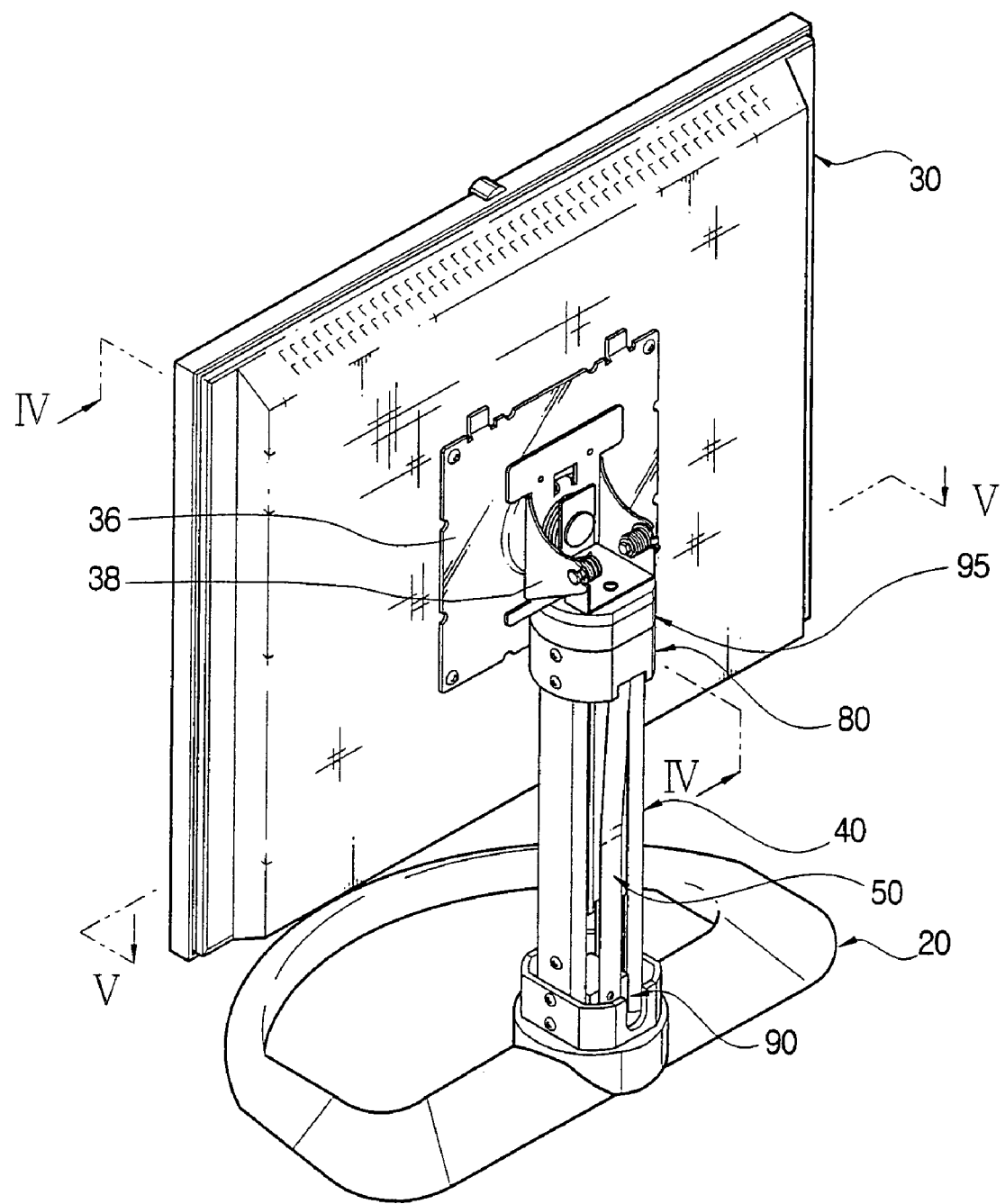
FIG. 1 is a perspective view of a display apparatus according to an aspect of the present invention.
Figure 2:
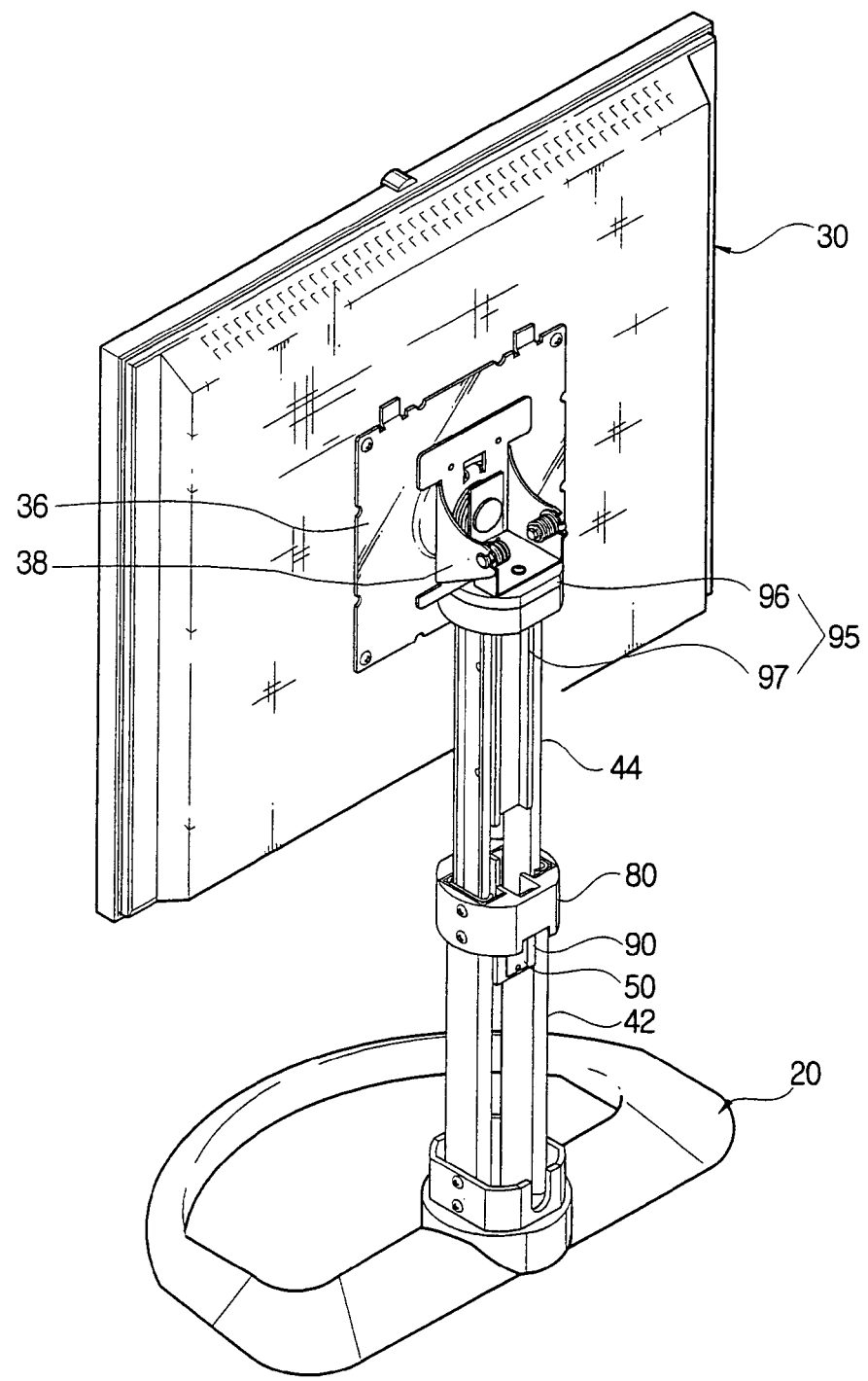
FIG. 2 is a perspective view of the display apparatus with a display main body lifted up.

Reference will now be made in detail to the embodiments of the present invention, examples of which are illustrated in the accompanying drawings, wherein like reference numerals refer to the like elements throughout.

Figure 3:
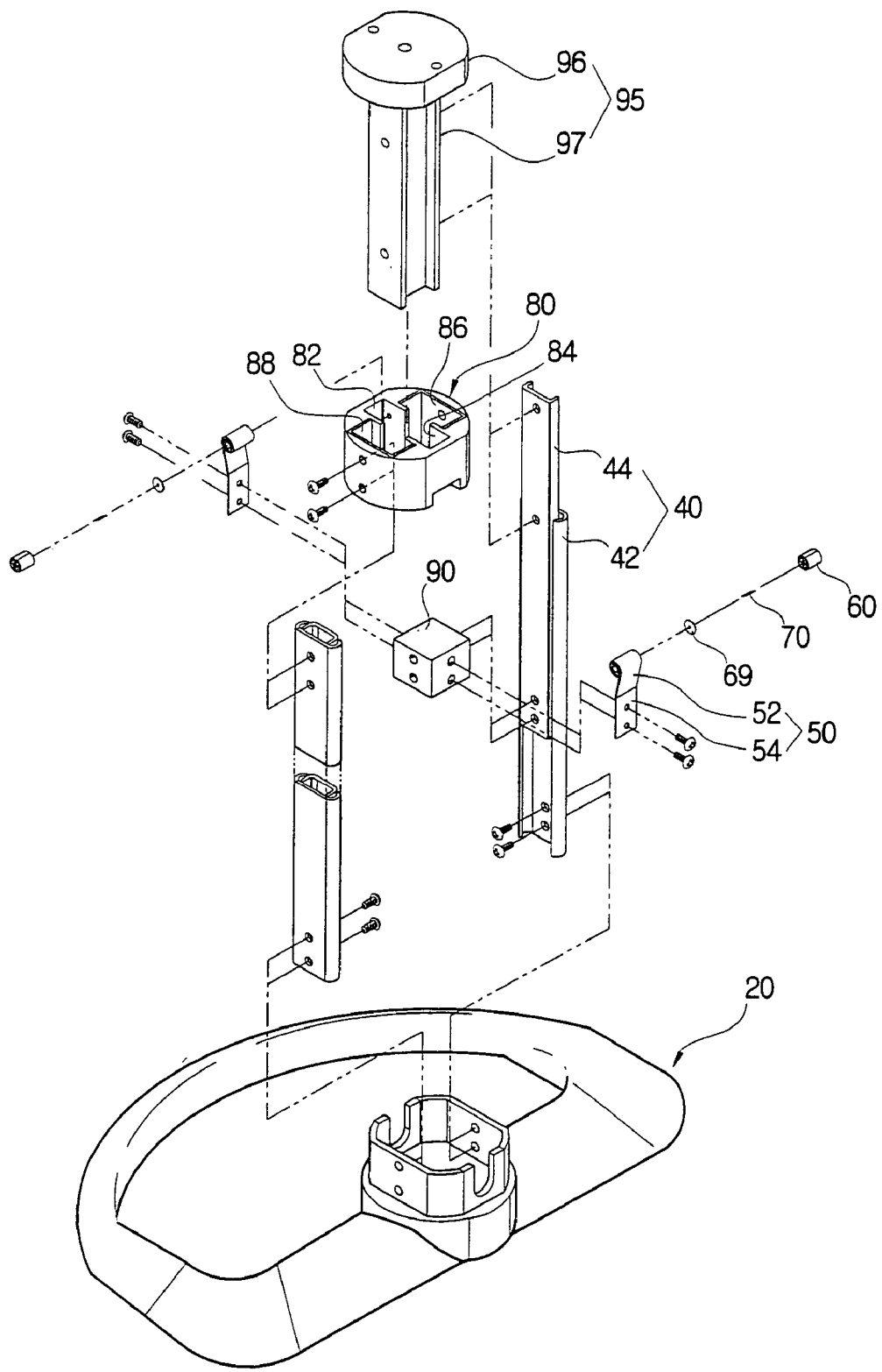
FIG. 3 is a partly exploded perspective view of the display apparatus of FIG. 1.

As shown in FIG. 1, a display apparatus according to an aspect of the present invention comprises: a base plate 20; a display main body 30 to display a picture thereon; a lifting member 40 having one end in contact with the base plate 20, and another end combined with the display main body 30 to adjust the height of the display main body 30; and at least one spiral spring 50 connected to the lifting member 40 to elastically support the weight of the display main body 30 where the spiral spring 50 extends and retracts accordingly as the display main body 30 is lifted up and lowered down. As shown in FIG. 3, the display apparatus further comprises: a supporter 60 connected to the at least one spiral spring 50 to extend/retract the at least one spiral spring 50 by rotation; and a friction member 70 inserted in the supporter 60 to be in contact with the at least one spiral spring 50 and to generate predetermined friction while the supporter 60 rotates, thereby, maintaining the height of the display main body 30 even when the weight of the display main body 30 is changed.

As shown in FIG. 3, the lifting member 40 includes a guide rail 42 in contact with the base plate 20, and a slider 44 slidably coupled with the guide rail 42 and combined to the display main body 30. According to an aspect of the invention, a parallel pair of the lifting members 40 is provided to increase lifting-stability, and the lifting members 40 may have a variety of shapes as long as the display main body 30 has adjustable height.

An upper part of the guide rail 42 is combined to a guide bracket 80, and a lower part of the slider 44 is combined to a spring supporting block 90 to cooperate with the slider 44. Further, the spiral spring 50 has a first end coupled to the guide bracket 80 and a second end fastened to the spring supporting block 90 by a screw or other fastening elements and/or techniques.

The at least one spiral spring 50 includes a wound part 52 coupled to the guide bracket 80, and a fastening part 54 extended from the wound part 52 and fastened to the spring supporting block 90. According to an aspect of the present invention, two spiral springs 50 are provided to front and rear of the guide bracket 80, respectively. However, the number of the spiral springs can vary as necessary. Accordingly, the elasticity of the spiral spring 50 is counterbalanced by the weight of the display main body 30.

The guide bracket 80 is formed with first and second accommodating parts 82 and 84 to accommodate the spiral springs 50, and third and fourth accommodating parts 86 and 88 to accommodate the guide rails 42. Here, the structure of the first, second, third, and fourth accommodating parts 82, 84, 86 and 88 is changeable in accordance with the shapes of the lifting members 40 and the spiral springs 50.

Figure 4:
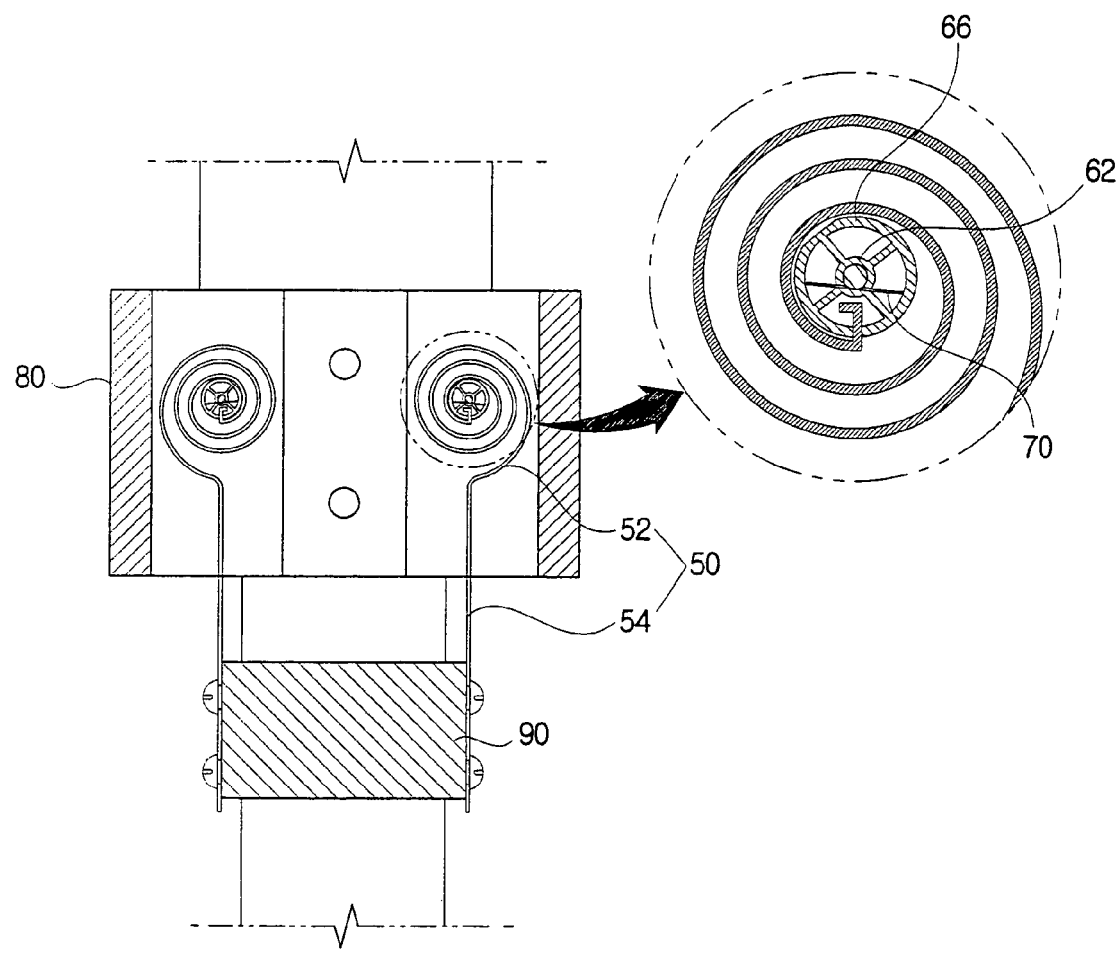
FIG. 4 is a sectional view of the display apparatus, taken along line IV-IV of FIG. 1.
Figure 5:
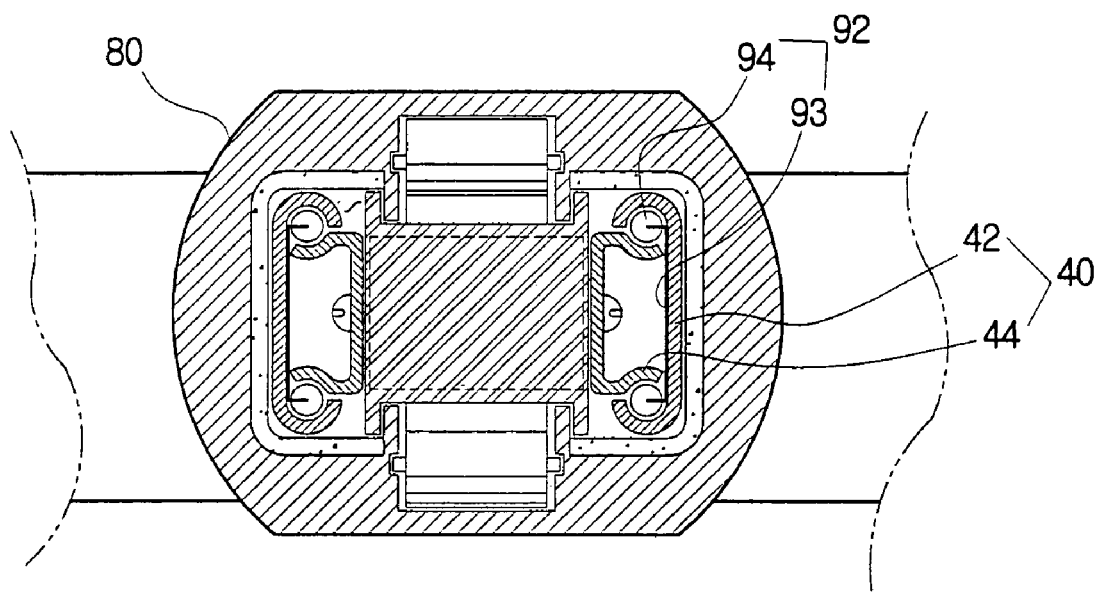
FIG. 5 is a sectional view of the display apparatus, taken along line V-V of FIG. 1.

According to an aspect of the present invention, the number of supporters 60 provided is equal to the number of spiral springs 50, and each supporter 60 includes a roller shaft 62 horizontally inserted in the first/second accommodating part 82,84, and a spring roller 66 in which the roller shaft 62 is rotatably inserted and on which the wound part 52 of the spiral spring 50 is wound (as shown in FIG. 4).

On one side of the spring roller 66 in which the friction member 70 is inserted is provided a breakaway prevention washer 69 (shown in FIG. 3) to prevent the friction member 70 from breaking away from the spring roller 66.

Between the guide rail 42 and the slider 44 is provided a ball bearing 92 to allow the slider 44 to smoothly slide along the guide rail 42.

The ball bearing 92 is interposed between the guide rail 42 and the slider 44, and comprises: a supporting pin 93 disposed along a lengthwise direction of the guide rail 42, and a rolling ball 94 rotatably supported between the guide rail 42 and the slider 44 by the supporting pin 93 and in rolling-contact with the slider 44.

Between the display main body 30 and the guide bracket 80 is provided a supporting bracket 95 (shown in FIG. 1), which according to an aspect of the invention comprises a supporting part 96 to support the display main body 30, and an extended part 97 extended down from the supporting part 96 and combined with the slider 44.

As shown in FIG. 1, a main bracket 36 and a connection assembly 38 are provided to connect the display main body 30 to the lifting member 40, where the main bracket 36 is in contact with the display main body on one side and in contact with the connection assembly on another.

Figure 6:
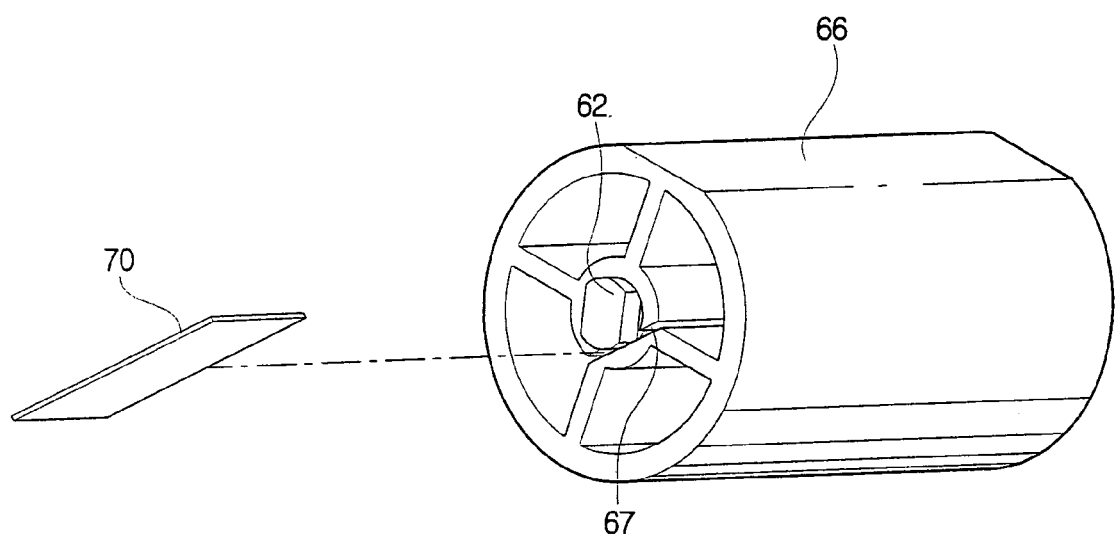
FIG. 6 is an exploded perspective view of a friction member and a spring roller.
Figure 7:
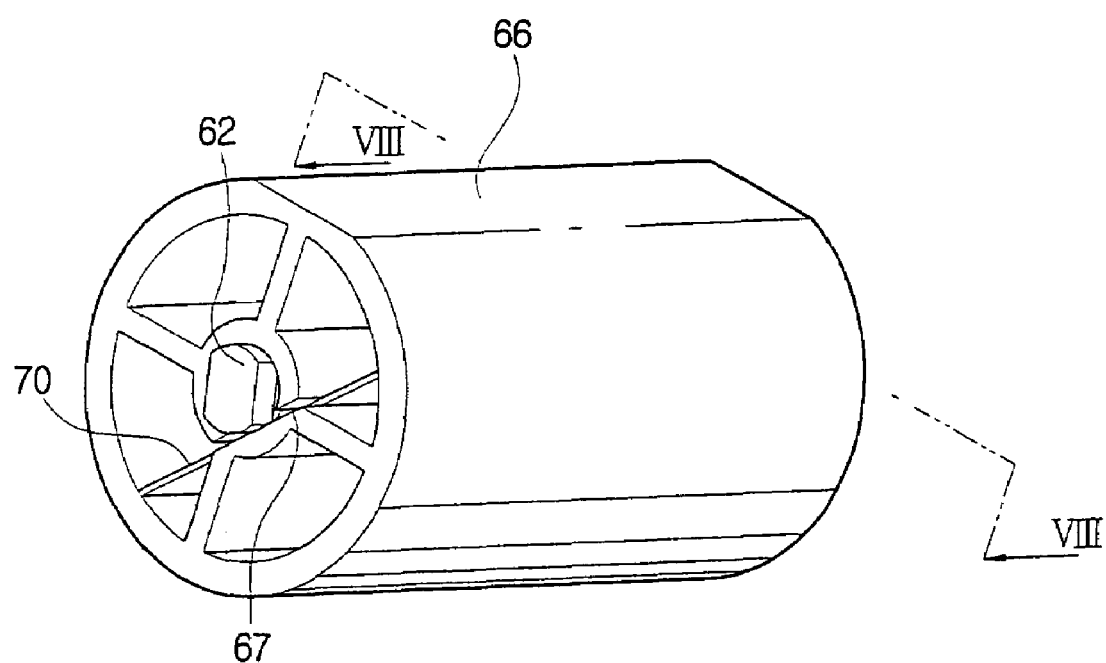
FIG. 7 is a combined perspective view of the friction member and the spring roller of FIG. 6.
Figure 8:
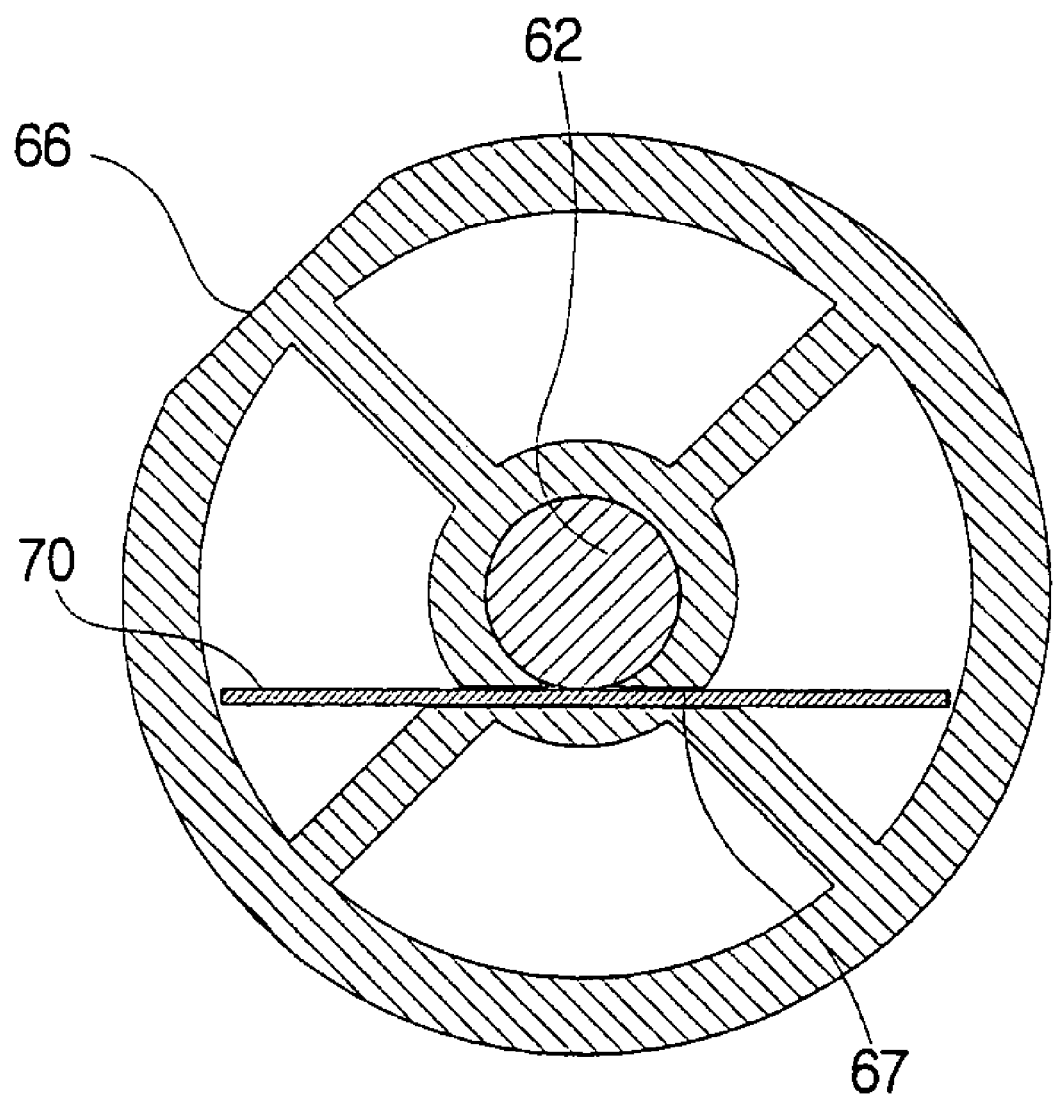
FIG. 8 is a sectional view of the friction member and the spring roller, taken along line VIII-VIII of FIG. 7.

As shown in FIG. 6, the friction member 70 is inserted in the spring roller 66, and in contact with the circumference of the roller shaft 62. Accordingly, the spring roller 66 is formed with a fitting groove 67 into which the friction member 70 is fitted.

The friction member 70 generates friction via contact with the roller shaft 62 to maintain the height of the display main body 30 even when the weight of the display main body 30 changes. The friction member includes a friction spring having a plate shape, but may alternatively include a similar element and/or method as long as friction is generated between the friction member 70 and the roller shaft 62.

Further, the friction member 70 may be plurally provided as necessary, and the structure and disposition of the friction member may be changed as long as friction is generated between the friction member 70 and the roller shaft 62.

Accordingly, the display apparatus according to the present invention operates as follows.

When the display main body 30 is lowered down to lower the height of the display main body 30, the slider 44 moves along the guide rail 42 making rolling-contact with the rolling ball 94. At this time, because the spring supporting block 90 is incorporated with the slider 44, the fastening part 54 of the spiral spring 50 fastened to the spring supporting block 90 moves down along with the spring supporting block 90.

Here, while the fastening part 54 of the spiral spring 50 is moving down, the wound part 52 of the spiral spring 50 is unwound along the circumference of the supporter 60, thereby, allowing the spring supporting block 90 to move down.

In this operation, the display main body 30 is lowered down, overcoming the elasticity of the spiral spring 50.

Thereafter, when a user releases the display main body 30 after adjusting the display main body 30 to a desired height, the display main body 30 remains at the adjusted position because the weight of the monitor main body 30 is counterbalanced by the elasticity of the spiral spring 50.

Accordingly, when the elasticity of the lifting member 40 is counterbalanced by the weight of the display main body 30, a height inflexibility problem of the display apparatus is resolved. In contrast, when the elasticity of the lifting member 40 is not counterbalanced by the weight of the display main body 30, the display main body 30 would not remain at the desired height and continues to move up and down in accordance with weight increase and decrease of the monitor main body 30. According to an aspect of the present invention, to solve the above and/or problems, the friction member 70 generates friction when in contact with the roller shaft 62 while the spring roller 66 rotates, so that the display main body remains at a desired height even when the weight of the display main body 30 is changed.

Similarly, when a user wants to increase the height of the display main body 30, the display main body 30 remains at a desired height.

As described above, the present invention provides a display apparatus in which a display main body remains at a desired height even when the weight of the display main body is changed.

Accordingly, the display apparatus of the present invention has improved function and provides convenience to the user.

Although a few embodiments of the present invention have been shown and described, it will be appreciated by those skilled in the art that changes may be made in this embodiment without departing from the principles and spirit of the invention, the scope of which is defined in the appended claims and their equivalents.

What is claimed is:

1. A display apparatus, comprising:
   a base plate;
   a display main body to display a picture thereon;
   a lifting member standing on the base plate and combined to the display main body to adjust a height of the display main body;
   at least one spiral spring connected to the lifting member, to elastically support weight of the display main body, and to extend and retract accordingly as the display main body is lifted up and lowered down;
   a supporter extending through a substantial portion of the at least one spiral spring, to extend and retract the at least one spiral spring via rotation;
   a friction member enclosed in the supporter to be in contact with the at least one spiral spring and to generate a predetermined friction while the supporter rotates to maintain the height of the display main body regardless of a change in weight of the display main body; and
   wherein the lifting member further comprises:
      a guide rail standing on the base plate; and
      a slider slidably coupled with the guide rail and combined to the display main body.

2. The display apparatus according to claim 1, wherein the lifting member further comprises:
   a pair of parallel lifting members.

3. The display apparatus according to claim 2, further comprising:
   a ball bearing provided between the guide rail and the slider.

4. The display apparatus according to claim 3, wherein the ball bearing is interposed between the guide rail and the slider, and comprises:
   a supporting pin disposed along a lengthwise direction of the guide rail; and
   a rolling ball rotatably supported between the guide rail and the slider via the supporting pin and in rolling-contact with the slider.

5. The display apparatus according to claim 3, further comprising:
   a supporting bracket provided between the main body and the guide bracket, wherein the supporting bracket comprises:
   a supporting part to support the display main body; and
   an extended part extended down from the supporting part and combined with the slider.

6. The display apparatus according to claim 2, further comprising:
   a guide bracket combined to an upper part of the guide rail; and
   a spring supporting block combined to a lower part of the slider; wherein the at least one spiral spring has a first end coupled to the guide bracket and a second end coupled to the spring supporting block.

7. The display apparatus according to claim 6, wherein the at least one spiral spring comprises:
   a wound part coupled to the guide bracket; and
   a fastening part extended from the wound part, and fastened to the spring supporting block.

8. The display apparatus according to claim 7, wherein the at least one spiral spring comprises:
   a pair of spiral springs provided to front and rear of the guide bracket, respectively.

9. The display apparatus according to claim 8, wherein the lifting member comprises:
   a pair of guide rails in contact with the base plate.

10. The display apparatus according to claim 9, wherein the guide bracket comprises:
    first and second accommodating parts to accommodate the pair of spiral springs, respectively; and
    third and fourth accommodating parts to accommodate the pair of guide rails, respectively.

11. The display apparatus according to claim 10, wherein a structure of the first, second, third, and fourth accommodating parts changes in accordance with a structure of the pair of lifting members and the pair of spiral springs.

12. The display apparatus according to claim 10, wherein the supporter comprises:
    a roller shaft horizontally inserted in the first and/or second accommodating part; and
    a spring roller in which the roller shaft is rotatably inserted and onto which the wound part of the pair of spiral springs is wound.

13. The display apparatus according to claim 12, further comprising:
    a breakaway prevention washer provided on one side of the spring roller, to prevent the friction member from breaking away from the spring roller.

14. The display apparatus according to claim 12, wherein the friction member is inserted in the spring roller, and the friction member is in contact with a circumference of the roller shaft.

15. The display apparatus according to claim 14, wherein the spring roller comprises:
    a fitting groove into which the friction member is fitted.

16. The display apparatus according to claim 15, further comprising:
    a breakaway prevention washer provided on one side of the spring roller, to prevent the friction member from breaking away from the spring roller.

17. The display apparatus according to claim 14, further comprising:
a breakaway prevention washer provided on one side of the spring roller, to prevent the friction member from breaking away from the spring roller.

18. The display apparatus according to claim 14, wherein the friction member generates friction via contact with the roller shaft to maintain the height of the display main body.

19. The display apparatus according to claim 1, further comprising:
a ball bearing provided between the guide rail and the slider.

20. The display apparatus according to claim 19, wherein the ball bearing is interposed between the guide rail and the slider, and comprises:
a supporting pin disposed along a lengthwise direction of the guide rail; and
a rolling ball rotatably supported between the guide rail and the slider via the supporting pin and in rolling-contact with the slider.

21. The display apparatus according to claim 20, further comprising:
a supporting bracket provided between the main body and the guide bracket, wherein the supporting bracket comprises:
a supporting part to support the display main body; and
an extended part extended down from the supporting part and combined with the slider.

22. The display apparatus according to claim 1, wherein elasticity of the at least one spiral spring is counterbalanced by the weight of the display main body.

23. The display apparatus according to claim 1, further comprising:
a main bracket coupled to a rear portion of the display main body; and
a connection assembly coupled to the main bracket to connect the display main body to the lifting member.

24. A display apparatus, comprising:
a base plate;
a display main body to display a picture thereon;
a lifting member standing on the base plate and combined to the display main body to adjust a height of the display main body;
at least one spiral spring connected to the lifting member, to elastically support weight of the display main body, and to extend and retract accordingly as the display main body is lifted up and lowered down;
a supporter extending through a substantial portion of the at least one spiral spring, to extend and retract the at least one spiral spring via rotation;
a friction member enclosed in the supporter to be in contact with the at least one spiral spring and to generate a predetermined friction while the supporter rotates to maintain the height of the display main body regardless of a change in weight of the display main body; and
wherein the friction member comprises:
a friction spring.

25. A display apparatus of a display main body, comprising:
a base plate;
a pair of lifting members extending from the display main body to the base plate to adjust height of the display main body;
a pair of spiral springs to elastically support a weight of the display main body;
a pair supporters connected to each spiral springs to extend and retract the pair of spiral springs via rotation; and
a pair of friction member having a friction springs inserted in each supporters and generating friction while the supporter rotate to maintain the height of the display main body even when weight of the display main body is changed.

26. The display apparatus according to claim 25, wherein elasticity of the pair of spiral springs is counterbalanced by the weight of the display main body.

27. The display apparatus according to claim 26, wherein the pair of lifting members further comprise:
a pair of guide rails with respective ends in contact with the base plate; and
a pair of sliders slidably coupled with the pair of guide rails, and combined to the display main body.

28. The display apparatus according to claim 27, further comprising:
a guide bracket combined to upper parts of the pair of guide rails; and
a spring supporting block combined to lower parts of the pair of sliders, wherein the pair of spiral springs have respective first ends coupled to the guide bracket and a second end coupled to the spring supporting block.

29. The display apparatus according to claim 28, wherein the guide bracket further comprises:
first and second accommodating parts to respectively accommodate the pair of spiral springs; and
third and fourth accommodating parts to respectively accommodate the pair of guide rails.

* * * * *

UNITED STATES PATENT AND TRADEMARK OFFICE
CERTIFICATE OF CORRECTION

PATENT NO. : 7,611,103 B2  Page 1 of 1
APPLICATION NO. : 10/792745
DATED : November 3, 2009
INVENTOR(S) : Ha et al.

It is certified that error appears in the above-identified patent and that said Letters Patent is hereby corrected as shown below:

First Page, Column 2 (Foreign Patent Documents), Line 1, change "131010 C" to --1031010 C--.

Column 8, Line 19, after "pair" insert --of--.

Signed and Sealed this

Nineteenth Day of January, 2010

David J. Kappos
*Director of the United States Patent and Trademark Office*